United States Patent [19]

Hancock

[11] Patent Number: 4,802,881

[45] Date of Patent: Feb. 7, 1989

[54] COUPLING MEMBER FOR TAKING UP TORQUE IN A VEHICLE STEERING COLUMN AND A VEHICLE STEERING COLUMN ASSEMBLY

[75] Inventor: Michael T. Hancock, Coventry, England

[73] Assignee: The Torrington Company Ltd., Coventry, England

[21] Appl. No.: 83,618

[22] Filed: Aug. 10, 1987

[30] Foreign Application Priority Data

Aug. 11, 1986 [GB] United Kingdom ............... 8619527

[51] Int. Cl.⁴ ........................... F16D 3/70; F16D 3/78
[52] U.S. Cl. ........................................ 464/93; 74/492; 464/160
[58] Field of Search ................ 74/492; 464/92, 93, 464/94, 95, 89, 160, 147

[56] References Cited

U.S. PATENT DOCUMENTS

| | | | |
|---|---|---|---|
| 1,935,390 | 11/1933 | Brown | 464/94 |
| 2,753,702 | 7/1956 | Dunn | 464/93 |
| 2,913,884 | 11/1959 | Pfeifer | 464/92 |
| 2,998,717 | 9/1961 | Schwenk | 464/93 |
| 3,380,314 | 4/1968 | Halsted | 464/95 |
| 4,282,723 | 8/1981 | Schmidt | 464/93 |
| 4,428,738 | 1/1984 | Loubier | 464/93 |

FOREIGN PATENT DOCUMENTS

| | | | |
|---|---|---|---|
| 2740827 | 3/1979 | Fed. Rep. of Germany | 464/93 |
| 55-54723 | 4/1980 | Japan | 464/93 |
| 2098908 | 12/1982 | United Kingdom | 464/92 |

Primary Examiner—Allan D. Herrmann
Assistant Examiner—Janice E. Chartoff
Attorney, Agent, or Firm—Frank S. Troidl

[57] ABSTRACT

A coupling member for taking up torque in a vehicle steering column to absorb vibration and vehicle body misalignment, the coupling member including a plastics disc with a pair of diametrically opposed bosses which protrude further from one face of the disc than from the other face, and another pair of diametrically opposed bosses which protrude further from the other face of the disc than from its one face.

The disc is able to distort upon application of torque through the bosses by means of a cut-out portion between each adjacent boss. A fail-safe deflection plate can be provided on each face of the disc to react against opposed pairs of bosses in the event of high application of torque. An adaptor piece holding one end of a steering column is fitted to one face of the disc and a splined flange is secured to the other face of the disc to enable the coupling member to be secured to another steering column component.

15 Claims, 4 Drawing Sheets

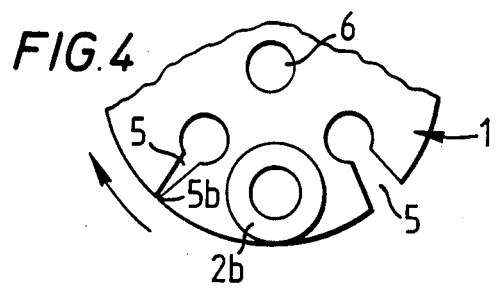
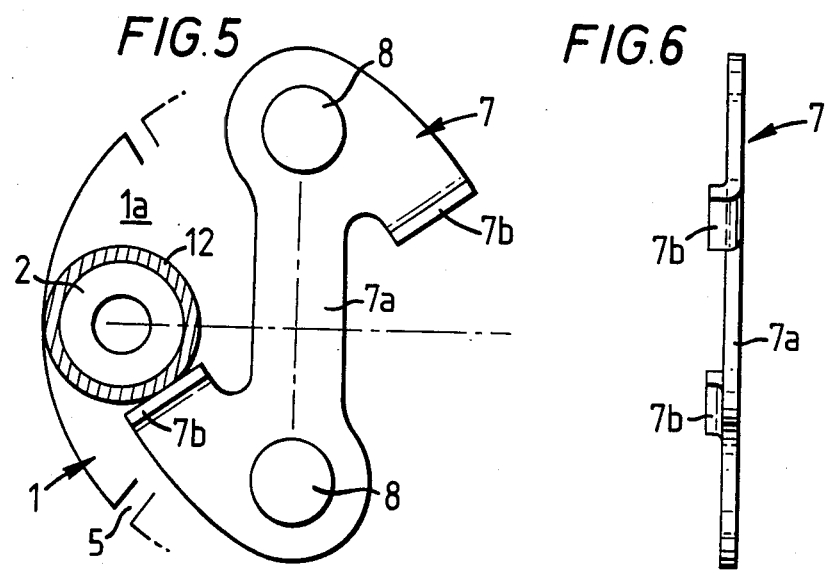

COUPLING MEMBER FOR TAKING UP TORQUE IN A VEHICLE STEERING COLUMN AND A VEHICLE STEERING COLUMN ASSEMBLY

This invention relates to a coupling member for taking up torque in a vehicle steering column and to a vehicle steering column assembly.

Some vehicle steering columns incorporate coupling members of a type which can absorb vibration and vehicle body misalignment.

One known form of coupling member is in the form of a disc and is made from a hard rubber, the disc having four bosses extending from each face of the disc, each boss housing a rivet, the rivets of two diametrically opposed bosses securing an adaptor piece to one face of the disc and the adaptor piece itself being rigidly secured to the end of a length of steering column. On the other face of the disc, the rivets of the other two diametrically opposed bosses secure a splined flange to this other face of the disc, the splined flange being for securing the coupling member to another component of the steering column assembly. One diametrically opposed pair of the bosses protrudes further from one face of the disc than from the other face whilst the reverse is true of the other diametrically opposed pair of bosses.

Each boss incorporates a cylindrical peg for strengthening purposes and a fabric or a nylon cord embedded in the rubber disc is wound tautly around and between the pegs, i.e., around and between the locations where the rivets pass through the coupling member. This cord is designed to take up torque and works in such a manner that turning moment through the steering column reacting against the component to which the splined flange is connected tends to tighten the cord embedded in the rubber disc between one pair of adjacent bosses, whilst the cord between one of those bosses and its other adjacent boss tends to loosen, the mirror image of this occurring on the diametrically-opposed side of the disc. In some applications, the cord is also wound around a center bush of the coupling member.

To act as a fail-safe feature for this known type of coupling member in the event of the failure of the rubber, two metal strips are provided, one of these metal strips being riveted to the pair of opposed bosses securing the adaptor piece to the coupling member but on the opposite face of the disc to the adaptor piece. The other metal strip is riveted to the other pair of bosses which secures the splined flange to the coupling member and again this metal strip is secured on the opposite face of the disc to the splined flange. The result of this is that a metal strip is secured to each face of the disc at right angles to one another.

Rubber couplings such as the ones described can be relatively expensive and have a high tooling cost. Furthermore, in certain circumstances, the cords can become exposed and thus sensitive to humidity changes, for example. Such could change the characteristics of the coupling member as regards its ability to take up torque.

According to the present invention, there is provided a coupling member for taking up torque in a vehicle steering column, the coupling member being formed as a disc with bosses extending from each face of the disc, there being a cut-out portion in said disc between adjacent bosses, each cut-out portion extending geerally radially of said disc and serving to accommodate deflection of the coupling member in use thereof.

Preferably, the coupling member is made from a theremoplastics material and is moulded as a solid plastics unitary member.

The coupling member may have four equally-spaced bosses around its periphery, each of the bosses extending substantially normally from both sides of the disc and one pair of diametrically opposed bosses protruding further from one face of the disc than from the other face of the disc. The other pair of diametrically opposed bosses is preferably arranged in the reverse fashion in that they protrude further from the other face of the disc than from its one face. The bosses are each intended to receive a stepped rivet which eliminates the need for a metal tube in the coupling, the rivets joining the coupling member to steering column components.

In order to meet specified load deflection curves, the material of the coupling should be able to flex initially and then, at higher torque, thrust faces are compressed which increases the torque required to deflect the coupling. To this end, the coupling is provided with the cut-out portions. The cut-out portions may extend from between adjacent bosses right to the outside periphery of the disc thereby forming slots or they may extend generally radially inwardly from between the bosses to be joined to one another at a central axial hole in the disc. In either case, the cut-out portions can each have an almost circular configuration, when the disc is viewed in plan, in the region immediately between the adjacent bosses, this circular configuration leading into a substantiallly parallel-sided slot when the coupling is not under stress.

A so-called fail-safe deflection plate can be provided on each face of the disc which is arranged to take up thrust by reacting against opposed bosses in an application of the coupling for high load conditions. A nylon or metal bush could be fitted to each coupling boss which is intended to bear against the deflection plate under stress, the bush serving to prevent the plate from cutting into the outside of the boss. The plate could be planar or can be provided with a bent-over edge at each part thereof which is intended to bear against a boss.

For a better understanding of the invention and to show how the same may be carried into effect, reference will now be made, by way of example, to the accompanying drawings, in which:

FIG. 4 is a diagrammatic plan view of part of the coupling member shown in FIG. 2, showing the condition of the coupling member when a torque is applied thereto;

FIG. 5 is a diagrammatic plan view partly cut-away showing a fail-safe deflection plate fitted to the coupling member.

FIG. 6 is a side view of the plate shown in FIG. 5.

FIG. 7 is a side view, partly in section, of a preferred form of rivet for use with the coupling member.

The drawings show a coupling member for taking up torque in a steering column, the coupling member being designed to absorb torque through the steering column resulting from vibration and vehicle body misalignment.

Figure 1:
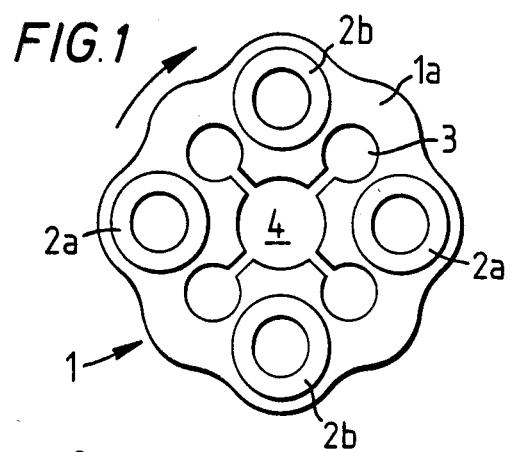
FIG. 1 is a diagrammatic plan view of a first form of coupling member according to the invention for taking up torque in a steering column assembly.
Figure 2:
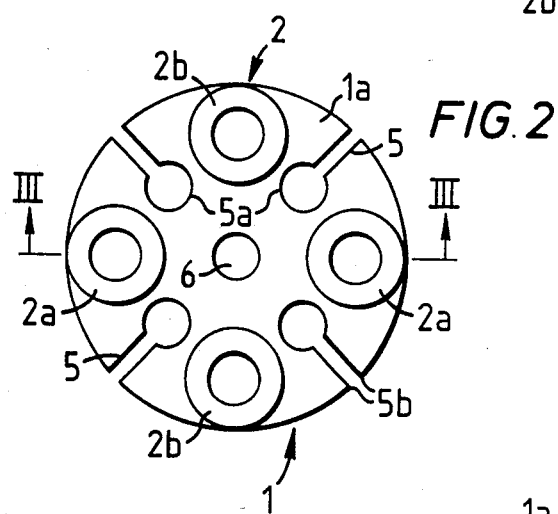
FIG. 2 is a diagrammatic plan view of a second form of coupling member according to the invention.
Figure 3:
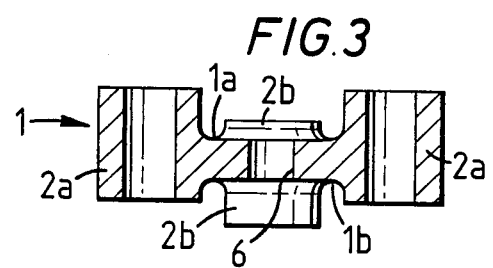
FIG. 3 is a cross-sectional view taken along the line III—III in FIG. 2.

The two forms of coupling member illustrated in FIGS. 1 and 2, respectively, are made from a thermoplastics material and are moulded as a solid plastics unitary member. Preferably, the material is that known and sold under the name "Hytrel".

Each coupling member includes a disc 1 having two faces 1a and 1b and having four bosses 2 equally-spaced around the periphery of the disc 1. Each boss extends substantially normally from both sides of the disc 1 and two of the bosses 2a are diametrically opposed and protrude further from one face 1a of the disc 1 than from its other face 1b. The other two bosses 2b are also diametrically opposed and in reverse protrude further from the other face 1b of the disc 1 than from its one face 1a.

In the embodiment shown in FIG. 1, the disc 1 has an outer periphery that is contoured to bulge around the outside of each boss 2 and is further bulged in the region between each boss 2. A cut-out portion 3 is provided in the disc 1 between each adjacent boss, each cutout portion 3 extending generally radially inwardly from between two adjacent bosses 2, each cut-out portion 3 meeting at a central axial hole 4. Outermost portions of each cut-out portion 3, i.e., those portions between the bosses 2, have an almost circular shape when viewed in plan.

With the embodiment shown in FIG. 2, a cut-out portion 5 is provided between each adjacent boss 2 but in this case the cut-out portion extends from between the adjacent bosses generally radially right to the outside periphery of the disc 1. The innermost ends 5a of the cut-out portions 5 each have an almost circular configuration when viewed in plan. With the embodiment shown in FIG. 2, a central hole 6 can be provided in the disc 1 which acts as a weakened portion of the disc and also saves on matrial costs.

The construction of both embodiments is such that, imagining that the two bosses 2a are rigidly held on one face 1a of the disc 1 and that a torque is applied to the other two bosses 2b on the opposite face 1b of the disc, the coupling member will distort to absorb the torque.

In the embodiment shown in FIG. 1, for example, if the bosses 2a are held and a torque is applied to the bosses 2b in the direction of the arrow, then the tendency will be for the bulge between each boss 2b and the next boss 2a in the clockwise direction as viewed in the drawing to become more pronounced whilst the bulges between each boss 2a and the next boss 2b when viewed in the clockwise direction to become less pronounced. The cut-out portions 3 also deflect accordingly.

With the embodiment shown in FIG. 2, typical deflection of the disc 1 is illustrated in FIG. 4. Initial application of torque causes the plastics to deflect until the point illustrated in FIG. 4 is reached where outermost tips 5b of two of the opposed cut-out portions 5 come into contact with one another and press against one another whilst the other two opposed cut-out portions 5 are opened out.

FIGS. 5 and 6 illustrate one form of a so-called fail-safe deflection plate 7 which is fitted to the coupling member in order to absorb further application of torque beyond that which produces the situation illustrated in FIG. 4.

FIGS. 5 and 6 show that the deflection plate 7 has a central portion 7a which extends between two of the opposed bosses 2, say on the face 1a, and is riveted by rivets 8 thereto and has two end bearing portions 7b extending respectively from the central portion 7a, against which bearing portions 7b the other two opposed bosses 2 on the face 1a can bear. In the form of deflection plate 7 illustrated, the bearing portions 7b are formed as bentover portions but instead the deflection plate 7 could be substantially flat throughout so that the bearing portions 7b are simply constituted by the end edges of the plate 7.

Figure 8:
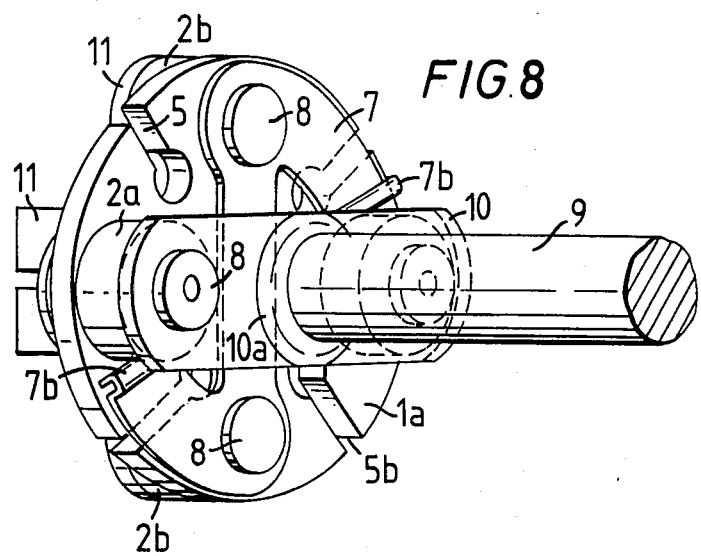
FIG. 8 is a perspective view taken from one side of the coupling member shown in FIG. 2 and showing it secured to a steering column and to another component.
Figure 9:
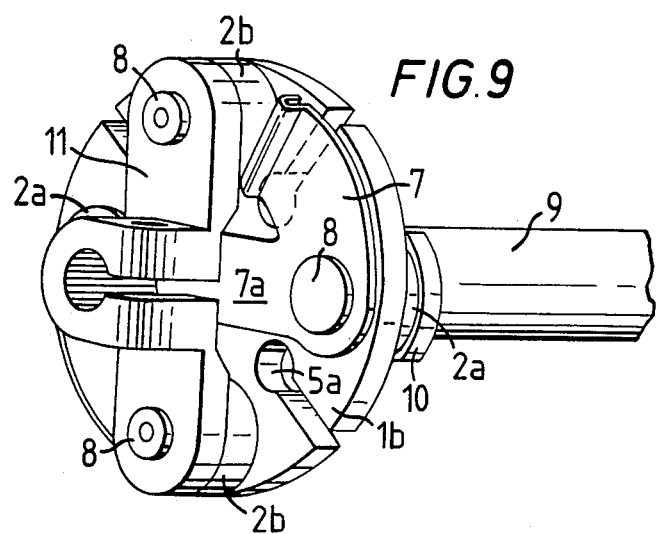
FIG. 9 is a perspective view taken from the other side of the coupling member and showing it secured to the same components shown in FIG. 8.

As best illustrated in FIGS. 8 and 9, two deflection plates 7 are provided, one on each face of the disc 1. One of the deflection plates 7 is riveted to the two opposed bosses 2a and enables the other two opposed bosses 2b on the same face of the disc to bear against that deflection plate 7, whilst the other deflection plate 7 is riveted to the bosses 2b on the other face of the disc 1 so that the bosses 2a on that face of the disc 1 can bear against that other deflection plate 7.

FIGS. 8 and 9 further illustrate one end of a steering column 9 to which is rigidly attached an adaptor piece 10 which is basically in the form of a metal strip spanning the diameter of the disc 1. The adaptor piece 10 has a collar 10a receiving the end of the steering column 9 and has an aperture at each end, these apertures being aligned with and fitting over the two opposed bosses 2a which protrude further from one face 1a of the disc 1 than from the other. The deflection plate 7 on that face 1a of the disc 1 is accordingly fitted underneath the adaptor piece 10 on the other two opposed bosses 2b which are the ones which do not protrude as far from that face 1a of the disc as the bosses 2a to which the adaptor piece 10 is attached.

On the opposite face 1b of the disc 1, i.e., the face facing away from the steering column 9, the corresponding deflection plate 7 is secured to the two bosses 2 to which the adaptor piece 10 is fixed. A splined flange 11 is fitted over this deflection plate 7 and is secured to the other two bosses 2b, the splined flange 11 being for connection to another component of the steering column assembly.

It will therefore be seen that the two deflection plates 7 cross one another substantially at right angles, one of them having the adaptor piece 10 extending over it and the other having the splined flange 11 extending over it.

The whole assembly is secured together by riveting using four rivets 8, one rivet 8 passing through each boss 2. FIG. 7 illustrates a preferred form of rivet, which is stepped to eliminate the need for a metal sleeve in each boss.

It will be seen that the deflection plates 7 take up the thrust by reacting against opposed bosses 2 when torque is applied to the coupling member and after the tips 5b of opposed cut-out portions 5 have been caused to bear on one another. Where the coupling member is intended for use under high load/torque conditions, a nylon or metal bush 12 (illustrated in FIG. 5) can be fitted about each boss 2 which is to bear against the deflection plates 7 under stress. The bushes 12 serve to prevent the bearing portions 7b of the plates 7 from cutting into the bosses 2.

It will be noted that the deflection plates 7 are orientated so that their bearing portions 7b face in the same angular direction on both faces of the coupling member so the other having the splined flange 11 extending over it. The whole assembly is secured together by riveting using four rivets 8, one rivet 8 passing through each boss 2. FIG. 7 illustrates a preferred form of rivet, which is stepped to eliminate the need for a metal sleeve in each boss.

It will be seen that the deflection plates 7 take up the thrust by reacting against opposed bosses 2 when torque is applied to the coupling member and after the tips 5b of opposed cut-out portions 5 have been caused to bear on one another. Where the coupling member is intended for use under high load/torque conditions, a nylon or metal bush 12 (illustrated in FIG. 5) can be fitted about each boss 2 which is to bear against the deflection plates 7 under stress. The bushes 12 serve to prevent the bearing portions 7b of the plates 7 from cutting into the bosses 2.

It will be noted that the deflection plates 7 are orientated so that their bearing portions 7b face in the same angular direction on both faces of the coupling member so that the reaction is taken up by the deflection plates 7 whichever direction the torque is applied. The deflection plates 7, as well as acting as a fail-safe feature to hold the assembly together in the event of failure of the coupling member, also act to strengthen the assembly in normal use.

Figure 10:
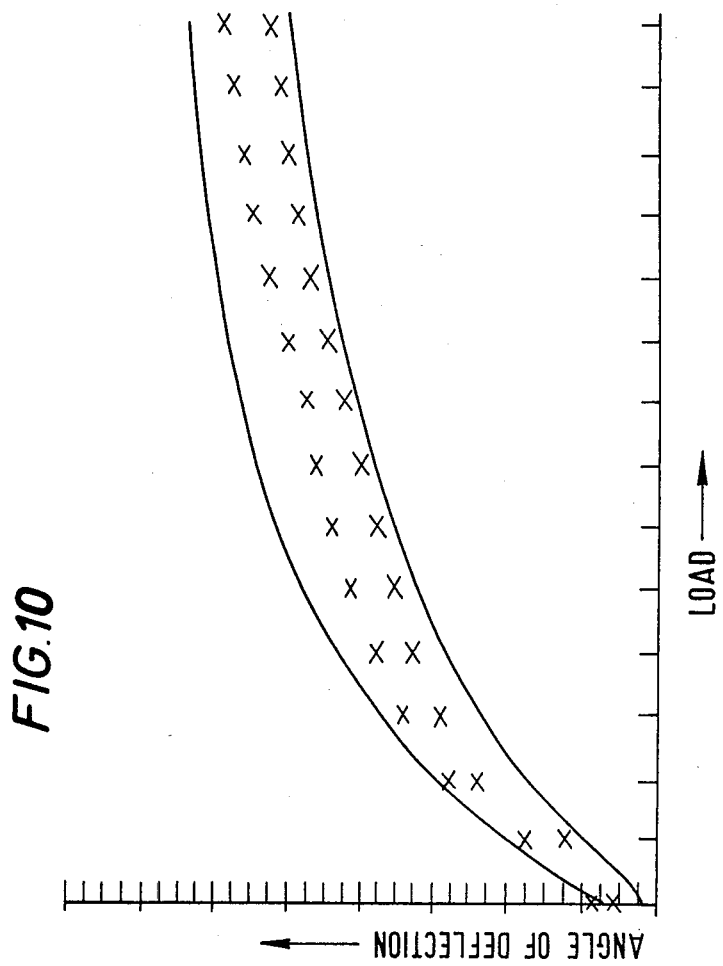
FIG. 10 is a graph illustrating a typical deflection test applied to the coupling member of FIG. 2 and showing the angle of deflection resulting from the load or torque applied to the coupling member.

FIG. 10 is a graph which illustrates the results of a typical deflection test using a coupling member according to the invention and it will be seen that, as the load (torque) increases, it has been found that the rate of change in the angle of deflection decreases. The optimum curve is achieved by "tuning" the coupling member and utilizing the sculptured shapes of the coupling member to the best advantage. To the same end, different hardnesses of plastics material can be utilized. So far as the curved configurations 5a are concerned, these provide initial flexure upon initial application of torque and they also serve to prevent tearing of the cut-out portions 5. Further application of torque causes the outermost tips 5b to bear against one another and yet further application of torque will cause the bosses 2 to bear against the deflection plates 7, the whole assembly acting in reaction against itself.

In certain conditions, it may be preferable to provide a bush inside each boss to save wear on the inside of the bosses, the rivets 8 passing through the bushes.

I claim:

1. A coupling member for taking up torque in a vehicle steering column comprising: a disc with bosses extending from each face of the disc, said disc having a cut-out portion between adjacent bosses, each cut-out portion extending generally radially of said disc and serving to accommodate deflection of the coupling member in use thereof; each face of the disc having a fail-safe deflection plate located to take up thrust by reacting against opposed bosses upon torque being applied through said bosses.

2. A coupling member according to claim 1 wherein each said cut-out portion extends from between adjacent bosses generally radially inwardly of said disc from between the bosses and are joined to one another at a central, axial hole in the disc.

3. A coupling member according to claim 1 wherein each said cut-out portion extends from between adjacent bosses to the outer periphery of the disc.

4. A coupling member according to claim 1 wherein said disc is provided with a central, axial hole.

5. A coupling member according to claim 1 wherein said disc is formed of a thermoplastics material.

6. A coupling member according to claim 1 wherein there are four equally-spaced bosses around the periphery of said disc, each boss extending substantially normally from both sides of the disc, two of the bosses being diametrically opposed and protruding further from one face of the disc than from its other face.

7. A coupling member according to claim 2 wherein each said cut-out portion has an almost circular configuration when the disc is viewed in plan, in the region immediately between the adjacent bosses, this circular configuration leading into a substantially parallel-sided slot when the coupling is not under stress.

8. A coupling member according to claim 3 wherein the bosses and slots are arranged such that, when a torque is applied to said disc through said bosses, one pair of opposed slots will close towards one another until eventually the tips of the slots bear against one another, whilst the other pair of slots correspondingly open out.

9. A coupling member according to claim 6 wherein the other two bosses are diametrically opposed and protrude further from said other face of said disc than from said one face thereof.

10. A coupling member according to claim 9 wherein each face of said disc is provided with a fail-safe deflection plate, each said deflection plate being secured to one said pair of diametrically opposed bosses on a respective face of the disc and has portions against which the other pair of diametrically opposed bosses on that face of the disc can bear, said portions of both said deflection plates facing in the same angular direction on the disc.

11. A coupling member according to claim 10 wherein each said deflection plate is substantially planar, said portion of each said deflection plate being constituted by a free edge of the plate.

12. A coupling member according to claim 10 wherein each said deflection plate is substantially planar, with each said portion thereof being formed as a bent-over portion on a free edge thereof.

13. A coupling member according to claim 10 wherein one said deflection plate is secured to one said pair of bosses on one face of said disc and the other said deflection plate is secured to the other said pair of bosses on the other face of said disc.

14. A coupling member according to claim 10 wherein an adaptor piece is secured to said bosses and arranged to receive one end of a length of steering column.

15. A coupling member according to claim 14 wherein said adaptor piece is arranged to lie over one of said deflection plates so that that deflection plate lies between said disc and said adaptor piece, and said adaptor piece being secured to the bosses to which said deflection plate is not secured.

* * * * *